United States Patent
Jones et al.

(10) Patent No.: US 11,762,812 B2
(45) Date of Patent: Sep. 19, 2023

(54) DETECTING CHANGES IN A NAMESPACE USING NAMESPACE ENUMERATION ENDPOINT RESPONSE PAYLOADS

(71) Applicant: MICROSOFT TECHNOLOGY LICENSING, LLC, Redmond, WA (US)

(72) Inventors: Brian David Jones, Woodinville, WA (US); Mark Thomas Mahony, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/548,411

(22) Filed: Dec. 10, 2021

(65) Prior Publication Data
US 2023/0185766 A1 Jun. 15, 2023

(51) Int. Cl.
*G06F 16/14* (2019.01)
*G06F 16/16* (2019.01)
(Continued)

(52) U.S. Cl.
CPC ............ *G06F 16/152* (2019.01); *G06F 9/546* (2013.01); *G06F 16/13* (2019.01); *G06F 16/164* (2019.01); *G06F 16/173* (2019.01)

(58) Field of Classification Search
CPC ........ G06F 9/546; G06F 16/13; G06F 16/152; G06F 16/164; G06F 16/173
See application file for complete search history.

(56) References Cited

U.S. PATENT DOCUMENTS 8,676,759 B1 3/2014 Zhu et al.
11,443,380 B2 * 9/2022 Cummings ............ G06Q 40/12
(Continued)

FOREIGN PATENT DOCUMENTS

CN 113010486 A 6/2021
EP 3555789 A1 10/2019
WO 2010035957 A2 4/2010

OTHER PUBLICATIONS

"Compare Two Versions of a Delta Table", Retrieved from: https://kb.databricks.com/delta/compare-versions-delta-table.html, Aug. 8, 2021, 2 Pages.
(Continued)

*Primary Examiner* — Angelica Ruiz
(74) *Attorney, Agent, or Firm* — Newport IP, LLC; Leonard J. Hope

(57) ABSTRACT

Technologies for detecting changes in a namespace using namespace enumeration endpoint response payloads are disclosed. A namespace is enumerated at a first time by retrieving response payloads containing metadata describing each location in the namespace from a namespace enumeration endpoint. Signatures are generated based on the response payloads and stored. To determine if changes were made to the namespace between the first time and a subsequent second time, metadata is retrieved from the namespace enumeration endpoint for the namespace at the second time and signatures are generated. Signatures generated at the first time are then compared to the signatures generated at the second time. If the signatures are different, the items in the location in the namespace changed between the first time and the second time. Changes occurring in a location of the namespace can then be identified based on the metadata obtained at the first and second times.

20 Claims, 12 Drawing Sheets

(51) Int. Cl.
*G06F 9/54* (2006.01)
*G06F 16/17* (2019.01)
*G06F 16/13* (2019.01)

(56) References Cited

U.S. PATENT DOCUMENTS

| | | |
|---|---|---|
| 2014/0052700 A1 | 2/2014 | Vanderspek et al. |
| 2014/0095625 A1 | 4/2014 | Quan et al. |
| 2014/0379655 A1 | 12/2014 | Kothule et al. |
| 2015/0294377 A1* | 10/2015 | Chow ................ G06Q 30/0263 |
| | | 705/347 |
| 2016/0182409 A1* | 6/2016 | Kraemer ................ H04L 25/20 |
| | | 370/417 |
| 2017/0075921 A1 | 3/2017 | Benton et al. |
| 2019/0347351 A1 | 11/2019 | Koomthanam et al. |
| 2020/0233978 A1* | 7/2020 | Sofia ..................... H04L 9/3247 |

OTHER PUBLICATIONS

Barré, Gérald, "Enumerating files using Globbing and System.IO. Enumeration", Retrieved From: https://www.meziantou.net/enumerating-files-using-globbing-and-system-io-enumeration.htm, Oct. 26, 2020, 5 Pages.

"International Search Report and Written Opinion Issued in PCT Application No. PCT/US22/042971", dated Jan. 9, 2023, 14 Pages.

* cited by examiner

DETECTING CHANGES IN A NAMESPACE USING NAMESPACE ENUMERATION ENDPOINT RESPONSE PAYLOADS

BACKGROUND

Many types of applications require precise comparison of a stored known state (sometimes referred to as a "checkpoint") of a namespace against the state of all items in the namespace at a subsequent point in time. Such a comparison can be utilized to identify the set of changes that have occurred in the namespace from the checkpoint to the subsequent point in time. For example, and without limitation, applications that provide functionality for synchronizing the items in a location on a file system of a client computer and a corresponding location on a remotely located server computer might utilize such a comparison in order to synchronize only those folders and files that are changed.

In applications such as those described above, it is desirable for synchro-nization of changes to occur as quickly as possible. Consequently, the comparison described above between a stored known state of a namespace and a subsequent state of the namespace should be performed in a highly performant manner. Previous mecha-nisms for performing such a comparison provide a reasonable level of performance but can be improved upon to provide even more performant identification of changes to a namespace and, potentially, other functionality.

It is with respect to these and other technical challenges that the disclosure made herein is presented.

SUMMARY

Technologies are disclosed for detecting changes in a namespace using namespace enumeration endpoint response payloads. Through implementations of the disclosed technologies, changes to a namespace can be detected by comparing deter-ministically derived signatures of response payloads received from a namespace enumeration endpoint at a first time to deterministically derived signatures of response payloads received from the namespace enumeration endpoint at a subsequent time. Implementations of the disclosed technologies can achieve faster than standard comparison results for non-changed locations in a namespace, thereby saving processor cycles and potentially other types of computing resources. Other technical benefits, some of which will be described in greater detail below, can also be realized through implementations of the disclosed subject matter.

In order to realize the technical benefits mentioned briefly above, and potentially others, a location in a namespace is enumerated at a first time by retrieving metadata from a namespace enumeration endpoint that describes the items in each location in the namespace. The namespace enumeration endpoint returns the metadata in response payloads. Signatures are generated for the response payloads and the signatures are stored for use in identifying changes to the namespace in the manner described below. The signatures are generated without inspecting the details of the metadata, thereby speeding up the process of signature generation.

In order to determine if changes have been made to the namespace between the first time and a subsequent second time, metadata is retrieved from the namespace enumeration endpoint that describes the items in each location in the namespace at the second time. Signatures are generated for the response payloads returned by the namespace enumeration endpoint at the second time.

The signatures generated at the first time are then compared to corresponding signatures generated at the second time to determine if they are different. If the signatures are different, this indicates that the items in the location in the namespace changed between the first time and the second time. In this case, the specific changes that occurred to the items in the location of the namespace can be identified by comparing the metadata obtained at the first time and the metadata obtained at the second time. Once the changes have been identified, additional operations might be performed such as, for example, synchronizing the changed items in the namespace.

In some embodiments, the namespace enumeration endpoint is a file system enumeration application programming interface ("API"). The file system enumeration API might provide functionality for enumerating a local file system or a remote networked file system. In these embodiments, the namespace corresponds to a portion of a file system that contains files and folders. For example, and without *limi*-*tation*, the location in the namespace might be the root of a file system or another location within the file system. The file system might be organized in a tree structure or in another manner.

The file system enumeration API receives requests for metadata describing the items within locations within the file system. In response thereto, the file system enumeration API returns response payloads that include metadata describing the items within specified locations in the file system. For example, the metadata returned by the file system enumeration API might specify attributes (e.g., name, creation date, last modified date, size, etc.) of files and folders in a specified location within a file system.

Signatures are calculated on the response payloads returned by the file system enumeration API in the manner described above. In some embodiments, a single signature is generated for each response payload. As will be described in greater detail below, per—response payload signatures can enable fine-grained identification of changes within a particular namespace location without inspection of each item in the location. In other embodiments, a single signature is generated for each location in a namespace by generating the signature based upon all of the response payloads for a particular location. This configuration enables fewer signatures to be generated and stored, thereby conserving processing resources.

In some embodiments, a map is created at the first time that enables quick enumeration of a namespace at the second time. In particular, the metadata returned by a namespace enumeration endpoint can be inspected at the first time to identify locations in the namespace that are direct descendants of each location in the namespace. For example, when the namespace corresponds to a file system, the folders that are direct descendants of each folder can be identified. Data can then be stored that defines a mapping between each location in the namespace and their direct descendants. This mapping can be utilized during comparison of the signatures for metadata to determine if they are different in order to enumerate the namespace without examining the metadata, thereby speeding up the comparison process.

As discussed briefly above, implementations of the technologies disclosed herein can provide faster than standard comparison results on non-changed locations in a namespace, thereby saving processor cycles and potentially other types of computing resources. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
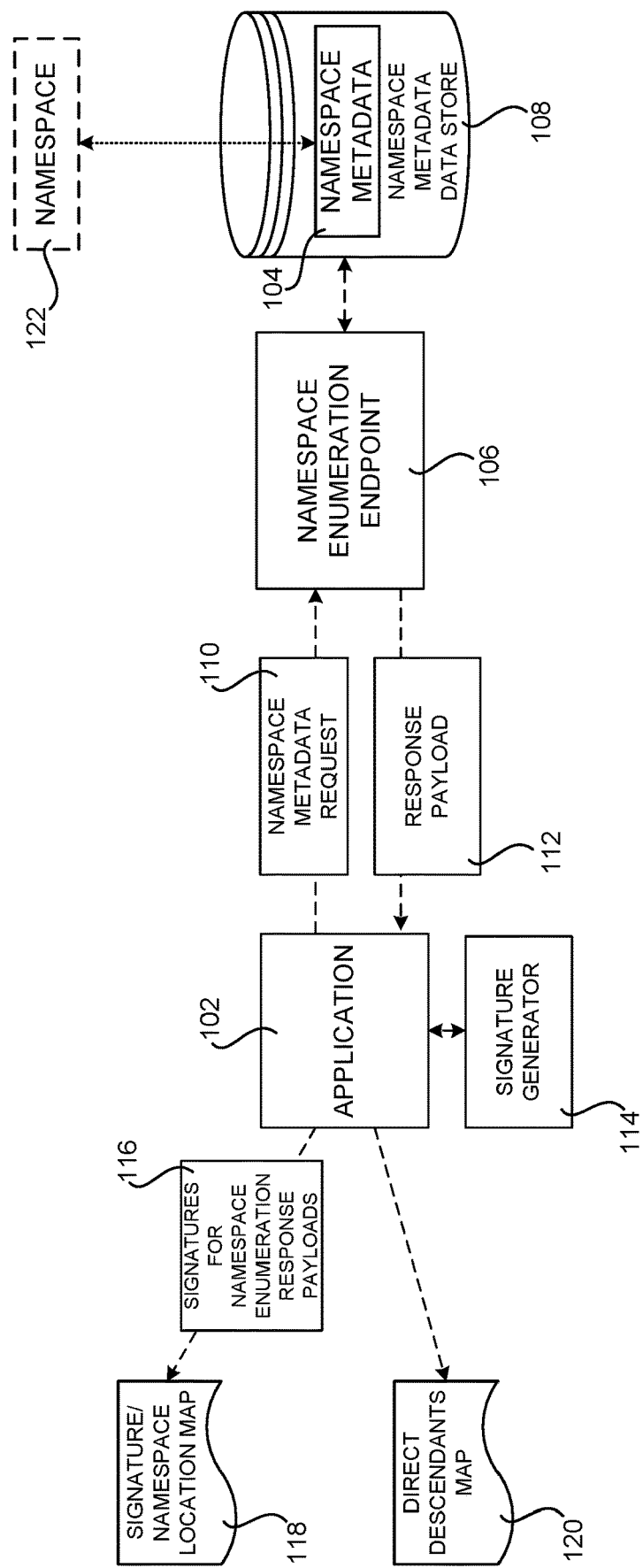
FIG. 1A is a computing architecture diagram that shows an overview of one mechanism disclosed herein for detecting changes in a namespace using namespace enumeration endpoint response payloads, according to embodiments disclosed herein.

The following detailed description is directed to technologies for detecting changes in a namespace using namespace enumeration endpoint response payloads. As discussed briefly above, implementations of the disclosed technologies can achieve faster than standard comparison results for non-changed locations in a namespace, thereby saving processor cycles and potentially other types of computing resources. Other technical benefits, at least some of which are described below, can also be realized through implementations of the disclosed subject matter.

While the subject matter described herein is presented in the general context of detecting changes to a namespace, those skilled in the art will recognize that other implementations can be performed in combination with other types of computing systems and modules. Those skilled in the art will also appreciate that the subject matter described herein can be practiced with other computer system configurations, including hand-held devices, multiprocessor systems, microprocessor-based or program-mable consumer electronics, computing or processing systems embedded in devices (such as wearable computing devices, automobiles, home automation etc.), minicom-puters, mainframe computers, and the like.

In the following detailed description, references are made to the accom-panying drawings that form a part hereof, and which are shown by way of illustration specific configurations or examples. Referring now to the drawings, in which like nu-merals represent like elements throughout the several FIGS., aspects of various technologies for detecting changes in a namespace using namespace enumeration endpoint response payloads will be described.

As discussed briefly above, many types of applications require precise comparison of a stored known state (sometimes referred to as a "checkpoint") of a namespace against the state of all items in the namespace at a subsequent point in time. Such a comparison can be utilized to identify the set of changes that have occurred in the namespace from the checkpoint to the subsequent point in time. For example, and without limitation, applications that provide functionality for synchronizing the items within a location on a file system of a client computer and a corresponding location on a remotely located server computer might utilize such a comparison in order to synchronize only those folders and files that are changed.

In applications such as those described above, it is desirable for synchro-nization of changes to occur as quickly as possible. Consequently, the comparison described above between a stored known state of a namespace and a subsequent state of the namespace should be performed in a highly performant manner. Previous mecha-nisms for performing such a comparison provide a reasonable level of performance but can be improved upon to provide even more performant identification of changes to a namespace and, potentially, other functionality. It is with respect to these and other technical challenges that the disclosure made herein is presented.

FIG. 1A is a computing architecture diagram that shows an overview of one mechanism disclosed herein for detecting changes in a namespace 122 using namespace enumeration endpoint response payloads 112, according to embodiments disclosed herein. As shown in FIG. 1A, an application 102 is configured in some embodiments to communicate with a namespace enumeration endpoint 106 in order to retrieve namespace metadata 104 that describes the items within each location in a namespace 122. The namespace enumeration endpoint 106 might store the namespace metadata 104 in a suitable data store 108 such as, but not limited to, on a data storage device, in memory, in a database, or in another location.

As also shown in FIG. 1A, the application might transmit a namespace metadata request 110 to the namespace enumeration endpoint 106 to request namespace metadata 104 for a particular location in the namespace 122. In some embodiments, the namespace metadata request 110 specifies an amount or size of metadata that is to be returned in response payloads 112 generated by the namespace enumeration endpoint 106. Accordingly, the namespace metadata 104 for a particular location in the namespace 122 might be provided in batches (i.e., multiple response payloads 112 of the specified size) when the amount of namespace metadata 104 for the location ex-ceeds the specified size. The application 102 might generate multiple namespace metadata requests 110 to retrieve multiple response payloads 112 containing namespace metadata 104 corresponding to a single location in the namespace 122. This process might be referred to herein as "batching" of response payloads 112.

In this regard, it is to be appreciated that the responses returned by the namespace enumeration endpoint 106 are deterministic. That is, the response payload 112 for a given location in the namespace 122 will not change between subsequent requests 110 if the items in that location of the namespace 122 has not changed. More-over, when the batching process described above is utilized to obtain multiple response payloads 112 for a single location in the namespace 122, the response payloads 112 for the location will be returned in the same order each time the requests 110 are made to the namespace enumeration endpoint 106.

In some embodiments, the application 102 is also configured to execute a signature generator 114 to generate signatures 116 for the namespace enumeration response payloads 112. The signatures 116 are deterministically-derived statistically unique representations of the response payloads 122. Because the signatures are deter-ministically-derived, the signature for a particular response payload 122 will always be the same unless the metadata 104 contained therein changes. The signature generator 114 generates the signatures 116 on the raw data in the response payloads 112 without inspecting the actual metadata 104 contained therein, thereby speeding up the process of signature generation.

In some embodiments, the signatures 116 are hashes of the response payloads 122 such as, for example, an SHA-1 hash. However, it is to be appreciated that other types of signatures can be utilized in other embodiments. For instance, in other embodiments the sizes of the response payloads 112 could be used as signatures for the respective payloads 112. In some embodiments, the signature generator 114 is modular and can be replaced with a new signature generator 114 that utilizes a faster or better signature generation technology as such technology becomes available.

Once the signatures 116 for a location in the namespace 122 have been generated, the application 102 stores the signatures 116. In some embodiments, the application 102 stores the signatures 116 in a signature/namespace location map 118. The signature/namespace location map 118 provides a mapping between locations in the namespace 122 and the corresponding signatures 116 for each location. The signature/namespace location map 118 might be stored in memory, on a data storage device, in a database, or in another manner. An illustrative signature/namespace location map 118 will be described below with reference to FIG. 2.

As shown in FIG. 1A, the application 102 also updates a direct descendants map 120 following the generation of the signatures 118 in some embodiments. As will be described in greater detail below, the direct descendants map 120 includes data that enables quick enumeration of the namespace 122 at a future point in time.

In order to generate the direct descendants map 120, the application can inspect the namespace metadata 104 in the response payloads 112 to identify the locations in the namespace 122 that are direct descendants of each location in the namespace 122. The application 102 can then store data in the direct descendants map 120 that defines a mapping between each location in the namespace 122 and their direct descendants.

As will be described below, the direct descendants map 120 can be utilized during comparison of the signatures 116 for metadata 104 to determine if they are different in order to enumerate the complete namespace 122 without examining the metadata 104 itself, thereby speeding up the comparison process. An illustrative direct descendants map 120 will be described below with reference to FIG. 3.

The process described above is repeated for each location in the namespace 122 in some embodiments. In this way, a signature/namespace location map 118 is generated for the entire namespace 122 that includes signatures 116 for each location in the namespace 122 and a direct descendants map 120 is generated that iden-tifies the direct descendants of each location in the namespace 122.

As will be described in greater detail below, the maps 118 and 120 can be utilized to determine if changes have been made to items within the namespace 122 at a subsequent time. Additional details regarding the enumeration of the namespace 122 and the generation of the signature/ namespace location map 118 and the direct descendants map 120 will be provided below with regard to FIGS. 5A and 5B.

In order to determine if changes have been made to the items in the namespace 122 between the time the maps 118 and 120 are created or last updated and a subsequent time, the application 102 again retrieves namespace metadata 104 from the namespace enumeration endpoint 106 for each location in the namespace. The signature generator 114 also generates signatures 116 for the response payloads 112 returned by the namespace enumeration endpoint 106 at the subsequent time.

The application 102 then compares the signatures stored in the signature/namespace location map 118 for each location to the newly generated signatures 116 to determine if they are different. If the signatures 116 are different for a location, this indicates that the items in the location in the namespace 122 changed between the time the signature/ namespace location map 118 was created or last updated and the subsequent time.

If the signatures 116 are different, the application 102 can identify the specific changes that occurred to the items in the location of the namespace 122 through a comparison of the metadata 104 obtained when the signature/namespace location map 118 was created and the metadata 104 obtained at the subsequent time. This process can be repeated for each location in the namespace 122 by utilizing the direct descendants map 120 to enumerate the entire namespace 122 and identify the changes, if any, that occurred at each location in the namespace 122.

Once any changes have been identified, additional operations might be performed such as, for example, synchronizing the changed items in the namespace 122. Additional details regarding this process will be provided below with regard to FIG. 6.

Figure 1B:
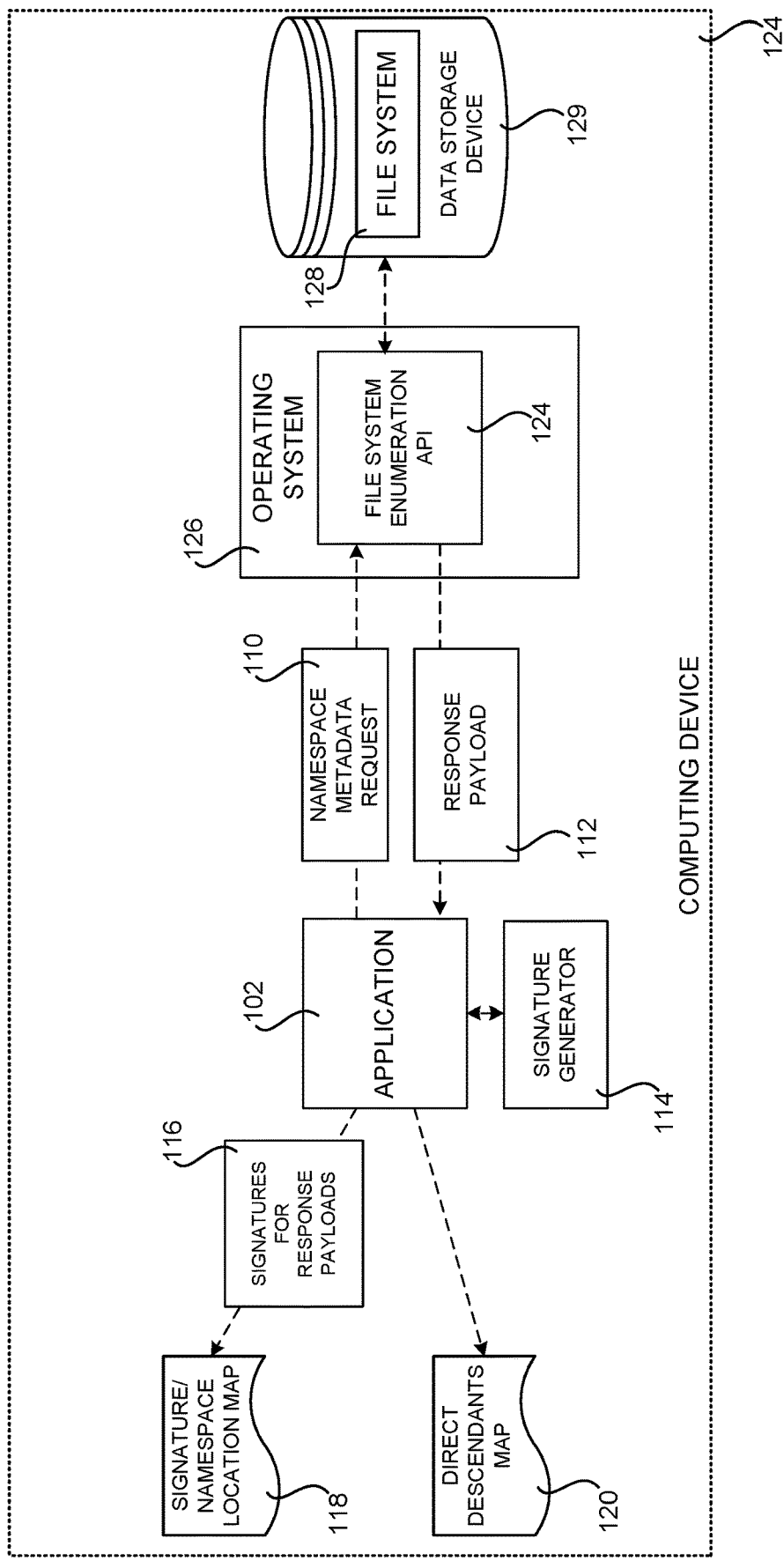
FIG. 1B is a computing architecture diagram that illustrates additional aspects of the mechanism shown in FIG. 1A for detecting changes in a namespace using namespace enumeration endpoint response payloads, according to one particular embodiment disclosed herein.

FIG. 1B is a computing architecture diagram that illustrates additional aspects of the mechanism shown in FIG. 1A for detecting changes in a namespace 122 using namespace enumeration endpoint response payloads 112, according to one particular embodiment disclosed herein. In the embodiment shown in FIG. 1B, the namespace enumeration endpoint 106 is a file system enumeration application programming interface ("API") 124, which is provided by an operating system 126 in some embodiments. The file system enumeration API 124 provides functionality for enumerating a local file system 128 stored on a data storage device 126 that is local to the computing device 124 executing the application 102.

In the embodiment shown in FIG. 1B, the namespace 122 corresponds to all or a portion of a file system 128 that contains files and folders. For example, and without limitation, the location in the namespace 122 from which enumeration begins might be the root of the file system 128 or another location within the file system 128. The file system 128 might be organized in a tree structure or in another manner. Additionally, the namespace metadata 104 describing the file system 128 might be stored in the file system 128 itself, stored in a database separate from the file system 128, or in another location.

As in the embodiment described above with regard to FIG. 1A, the file system enumeration API 124 shown in FIG. 1B can receive requests 110 for metadata 104 describing the items within locations within the file system 128. In response thereto, the file system enumeration API 124 returns response payloads 112 that include metadata 104 describing the items in specified locations in the file system 128. For example, the metadata 104 returned by the file system enumeration API 124 in the payloads 112 might specify attributes (e.g., name, creation date, last modified date, size, etc.) of files and folders in a specified location within the file system 128. As in the embodiment described above with regard to FIG. 1A, the file system enumeration API 124 can support batching of response payloads 112 for a given location.

In some embodiments, the namespace metadata request 110 specifies the type of metadata 114 that is to be returned by the file system enumeration API 124. For example, and without limitation, the namespace metadata request 110 might specify that only attributes defining an item's name, creation date, last modified date, and size are to be returned. In this manner, the application 102 can request a subset of the available metadata 114 for each item in the namespace 114.

As in the embodiment described above with regard to FIG. 1A, the signature generator 114 can generate signatures 116 on the response payloads 112 returned by the file system enumeration API 124. In some embodiments, the signature generator 114 generates a single signature 116 for each response payload 112. As mentioned briefly above, per-response payload signatures 116 can enable fine-grained identification of changes within a particular namespace location without inspection of each item in the location. Additional details regarding the generation and utilization of per-payload signatures 116 will be provided below with regard to FIG. 4A.

In other embodiments, the signature generator 114 generates a single signature 116 for each location in a namespace 122 (e.g., the file system 128) by generating a signature 116 that is based upon all of the response payloads 112 for a particular location. This configuration enables fewer signatures to be generated and stored, thereby conserving processing resources. Additional details regarding the generation and utilization of per-location signatures 116 will be provided below with regard to FIG. 4B.

In other respects the embodiment shown in FIG. 1B operates the same as that shown in FIG. 1A and described above. For example, and without limitation, the application 102 can enumerate the file system 128 or a specific location within the file system 128 at a first time by retrieving response payloads 112 containing metadata 104 describing the items in each location in the file system 128 or a location within the file system 128 from the file system enumeration API 124. As discussed above, the signature generator 114 can generate per-payload or per-location signatures 116 and store the signatures in the signature/namespace location map 118. The application 102 can also generate the direct descendants map 120 in the manner described above.

To determine if changes were made to the file system 128 or a location in the file system 128 between the time the map 118 was created or last updated and a subsequent time, the application 102 can again enumerate the file system 128 or location within the file system 128 using the file system enumeration API 124 and generate signatures 116 of the response payloads 112. The application 102 can then compare the signatures 116 stored in the map 118 at the time the map 118 was created or last updated to the newly generated signatures 116.

If the signatures 116 are different, the items in the file system 128 or the location in the file system 128 changed between the time the map 118 was created or last updated and the subsequent time. The application 102 can then identify the specific changes that occurred by comparing the metadata 104 obtained for the file system 128 at the time the map 118 was created or last updated and the metadata 104 obtained for the file system 128 at the subsequent time. Additional details regarding these processes will be provided below with regard to FIGS. 5A-6.

Figure 1C:
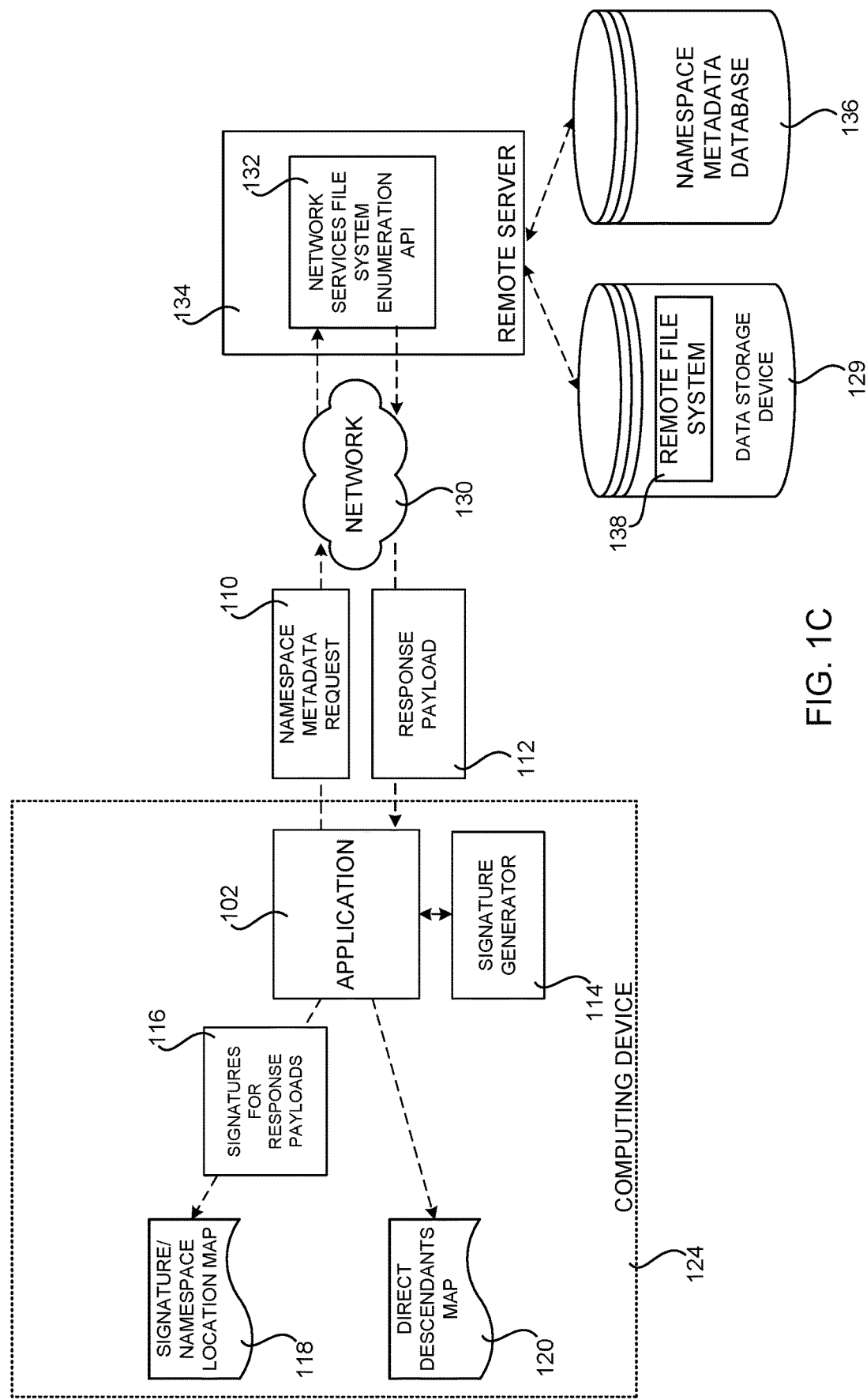
FIG. 1C is a computing architecture diagram that illustrates additional aspects of the mechanism shown in FIG. 1A for detecting changes in a namespace using namespace enumeration endpoint response payloads, according to one particular embodiment disclosed herein.

FIG. 1C is a computing architecture diagram that illustrates additional aspects of the mechanism shown in FIG. 1A for detecting changes in a namespace using namespace enumeration endpoint response payloads, according to one particular embodiment disclosed herein. In the embodiment shown in FIG. 1C, the namespace enumeration endpoint 106 is a network services file system enumeration API 132 exposed by a remote server 134.

The network services file system enumeration API 132 provides functionality for enumerating a remote file system 138 stored by a data storage device 129 or network service that is remote to the computing device 124 executing the application 102. As shown in FIG. 1C, the application 102 can utilize the functionality provided by the network services file system enumeration API 132 by establishing a connection to the remote server 134 over the network 130.

In the embodiment shown in FIG. 1C, the namespace 122 corresponds to all or a portion of a remote file system 138 that contains files and folders. For example, and without limitation, the location in the namespace 122 from which enumeration begins might be the root of the remote file system 138 or another location within the remote file system 138. As in the example described above, the remote file system 138 might be organized in a tree structure or in another manner. Additionally, the namespace metadata 104 describing the remote file system 138 might be stored in the remote file system 138 itself, stored in a database 136 separate from the remote file system 138, or in another location.

The network services file system enumeration API 132 shown in FIG. 1C can receive requests 110 over the network 130 for metadata 104 describing the items within locations within the remote file system 138. In response thereto, the network services file system enumeration API 132 returns response payloads 112 that include metadata 104 describing the items in specified locations in the remote file system 138. For example, the metadata 104 returned by the network services file system enumeration API 132 in the payloads 112 might specify attributes (e.g., name, creation date, last modified date, size, etc.) of files and folders in a specified location within the remote file system 138. As in the embodiment described above with regard to FIGS. 1A and 1B, the network services file system enumeration API 132 can support batching of response payloads 112 for a given location.

As also in the embodiments described above with regard to FIGS. 1A and 1B, the signature generator 114 can generate signatures 116 on the response payloads 112 returned by the network services file system enumeration API 132. In some embodiments, the signature generator 114 generates a single signature 116 for each response payload 112. In other embodiments, the signature generator 114 generates a single signature 116 for each location in a namespace 122 (e.g., the remote file system 138) by generating a signature 116 that is based upon all of the response payloads 112 for a particular location. Additional details regarding the generation and utilization of per-payload and per-location signatures 116 will be provided below with regard to FIGS. 4A and 4B, respectively.

In other respects the embodiment shown in FIG. 1C operates the same as that shown in FIGS. 1A and 1B and described above. For example, and without limitation, the application 102 can enumerate the file system 128 or a specific location within the file system 128 at a first time by retrieving response payloads 112 containing metadata 104 describing each location in the remote file system 138 or a location within the remote file system 138 from the network services file system enumeration API 132. As discussed above, the signature generator 114 can generate per-payload or per-location signatures 116 and store the signatures in the signature/namespace location map 118. The application 102 can also generate the direct descendants map 120 in the manner described above.

To determine if changes were made to the remote file system 138 or a location in the remote file system 138 between the time the map 118 was created or last updated and a subsequent time, the application 102 can again enumerate the remote file system 138 or location within the remote file system 138 using the network services file system enumeration API 132 and generate signatures 116 of the response payloads 112. The application 102 can then compare the signatures 116 stored in the map 118 at the time the map 118 was created or last updated to the newly generated signatures 116.

If the signatures 116 are different, the items in the remote file system 138 or the location in the remote file system 138 changed between the time the map 118 was created or last updated and the subsequent time. The application 102 can then identify the specific changes that occurred by comparing the metadata 104 obtained for the file system 128 at the time the map 118 was created or last updated and the metadata 104 obtained for the remote file system 138 at the subsequent time. Additional details regarding these processes will be provided below with regard to FIGS. 5A-6.

Figure 2:
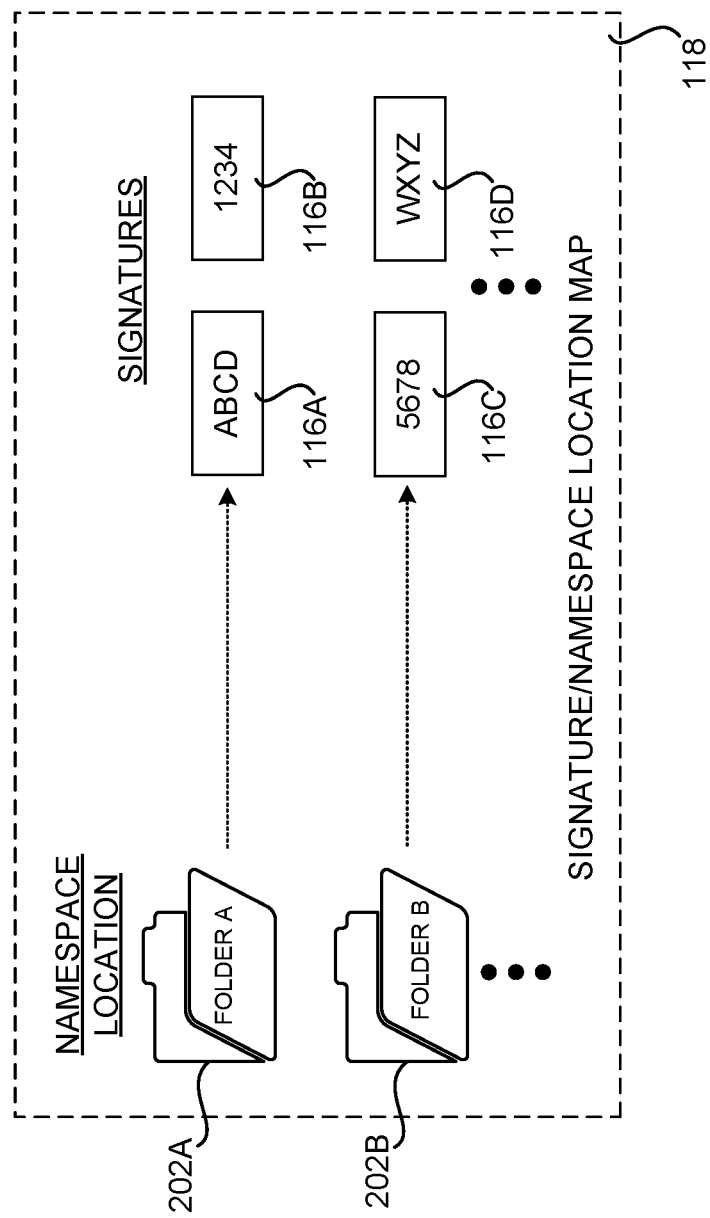
FIG. 2 is a data structure diagram illustrating aspects of a signature/namespace location map utilized in various embodiments disclosed herein for detecting changes in a namespace using namespace enumeration endpoint response payloads.

FIG. 2 is a data structure diagram illustrating aspects of a signature/namespace location map 118 utilized in various embodiments disclosed herein for detecting changes in a namespace 122 using namespace enumeration endpoint response payloads 112. As discussed briefly above, the signature/namespace location map 118 provides a mapping between locations in a namespace 122 and the corresponding signatures 116 for each location. As also discussed above, the signature/namespace location map 118 might be stored in memory, on a data storage device, in a database, or in another manner.

In the example signature/namespace location map 118 shown in FIG. 2, the namespace 122 is a local or remote file system that includes two folders 202A and 202B. The application 102 has generated and stored two signatures 116A and 116B for the folder 202A and two signatures 116C and 116D for the folder 202B in this example.

Additionally, in the example shown in FIG. 2 the signature/namespace location map 118 has been indexed based upon location. In this manner, the signatures 116 for a particular location in the local or remote file system can be retrieved based on the location. The signature/namespace location map 118 might be indexed in other ways in other embodiments such as, for example, indexing based upon a file system identifier ("FSID") associated with a location. In this regard it is to be appreciated that the signature/namespace location map 118 shown in FIG. 2 has been simplified for discussion purposes and that an actual signature/namespace location map 118 would likely contain many other entries than shown in FIG. 2.

Figure 3:
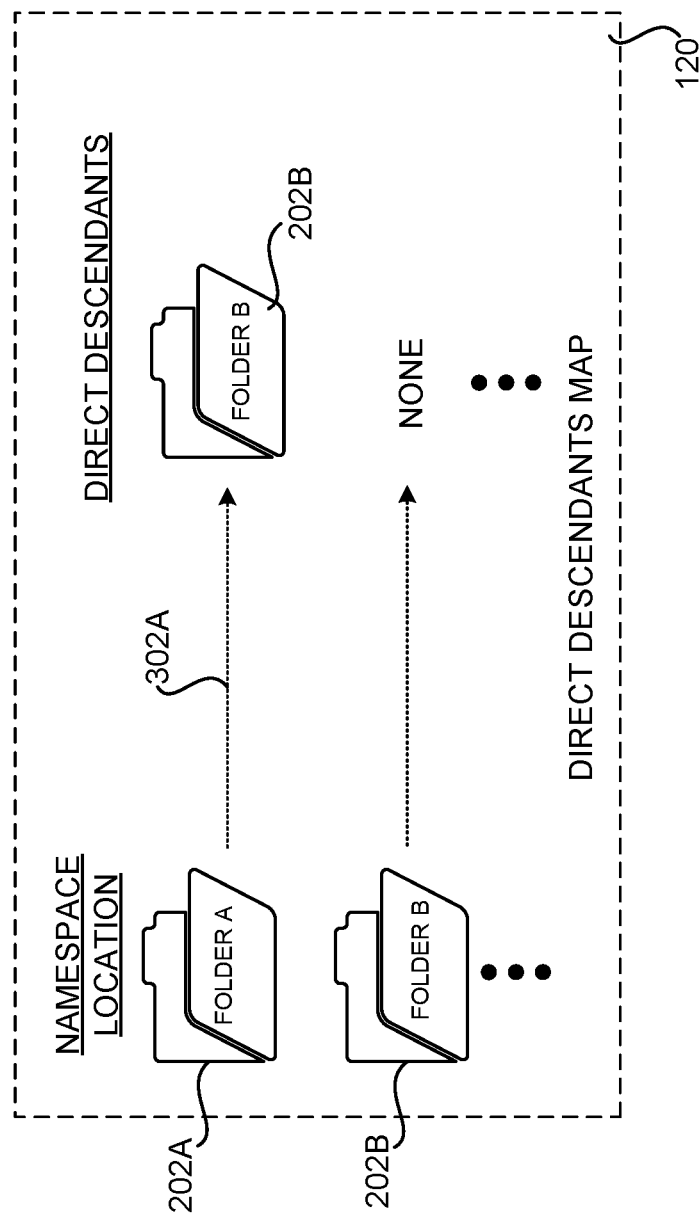
FIG. 3 is a data structure diagram illustrating aspects of a direct descendants map utilized in various embodiments disclosed herein for detecting changes in a namespace using namespace enumeration endpoint response payloads.

FIG. 3 is a data structure diagram illustrating aspects of a direct descendants map 120 utilized in various embodiments disclosed herein for detecting changes in a namespace 122 using namespace enumeration endpoint response payloads 122. As discussed briefly above, the direct descendants map 120 includes data that enables quick enumeration of a namespace 122.

In order to generate the direct descendants map 120, the application 102 can inspect the namespace metadata 104 in the response payloads 112 to identify the locations in the namespace 122 that are direct descendants of each location in the namespace 122. The application 102 can then store data 302A in the direct descendants map 120 that defines a mapping between each location in the namespace 122 and their direct descendants.

In the example direct descendants map 120 shown in FIG. 3, for instance, the application has stored data 302A indicating that the folder 202B is a direct descendant of the folder 202A. The folder 202B has no direct descendants in the illustrated example. As will be described below, the application 102 can utilize the direct descendants map 120 during comparison of the signatures 116 for metadata 104 in order to enumerate the complete namespace 122 (e.g., the file system 128 or the remote file system 138) without examining the metadata 104 itself, thereby speeding up the comparison process.

Figure 4A:
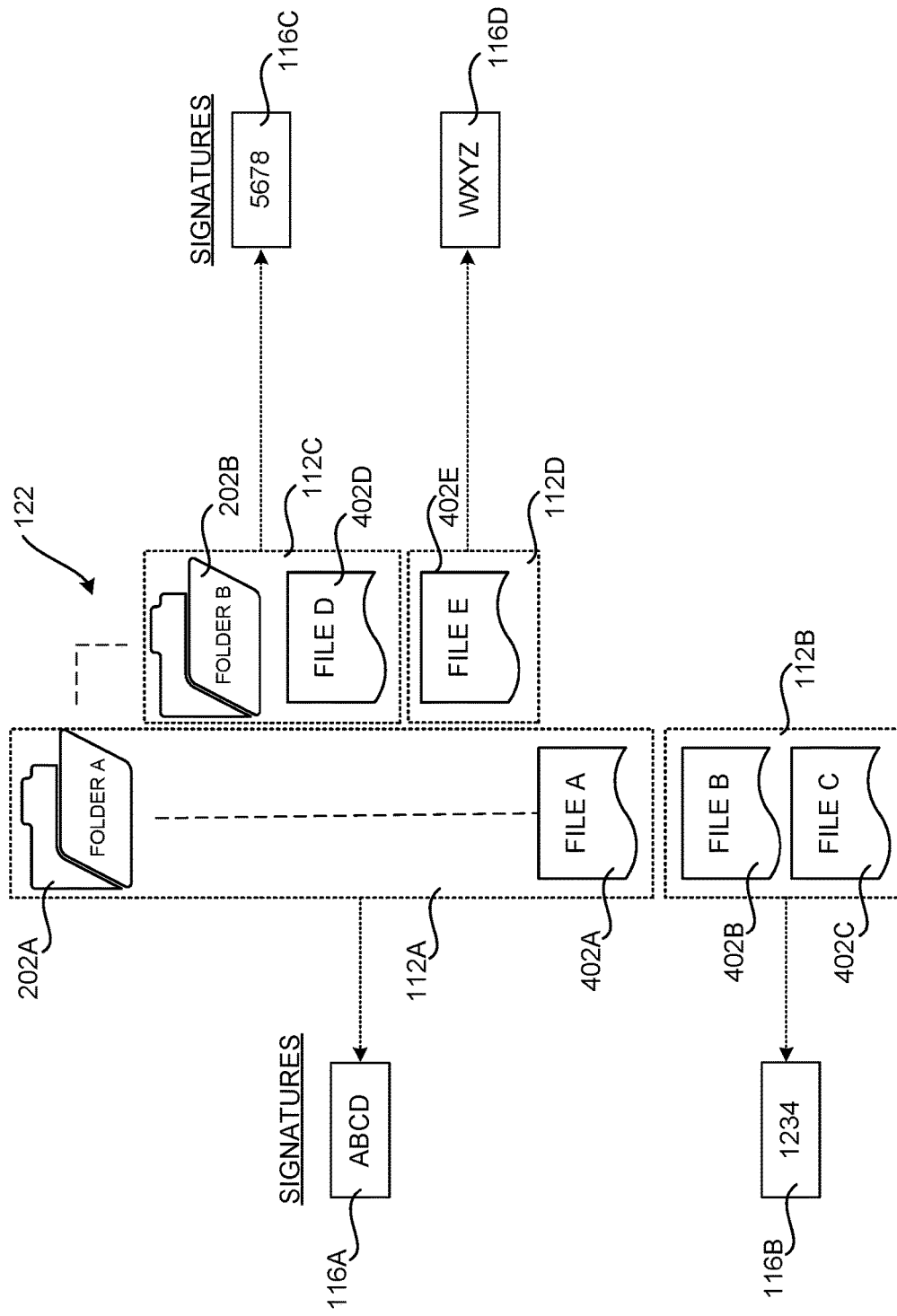
FIG. 4A is a namespace diagram showing an example namespace and illustrating aspects of one mechanism disclosed herein for computing signatures per namespace enumeration endpoint response payload, according to one embodiment disclosed herein.

FIG. 4A is a namespace diagram showing an example namespace 122 and illustrating aspects of one mechanism disclosed herein for computing signatures 116 per response payload 112 according to one embodiment disclosed herein. In the example shown in FIG. 4A, the namespace 122 is a location within a local or remote file system. The example location includes a folder 202A that stores four files 402A-402C and a folder 202B. The folder 202B, in turn, stores two files 402D and 402E.

In the example shown in FIG. 4A, four response payloads 112 have been obtained. The response payload 112A includes metadata 104 for the folder 202A and the file 402A, the response payload 112B includes metadata 104 for the files 402B and 402C, the response payload 112C includes metadata 104 for the folder 202B and the file 402D, and the response payload 112D includes metadata 104 for the file 402E.

Because the application 102 is configured to generate signatures on a per-payload basis in this example, the application has generated a signature 116A for the payload 112A, a signature 116B for the payload 112B, a signature 116C for the payload 112C, and a signature 116D for the payload 112D. As mentioned briefly above and discussed in greater detail below, generation of per—response payload signatures 116 such as that shown in FIG. 2 can enable fine-grained identification of changes within a particular location in a namespace 122 without inspection of each item in the location. Additional details regarding one mechanism for generating signatures 116 for response payloads 112 on a per-payload basis will be provided below with respect to FIG. 5A.

Figure 4B:
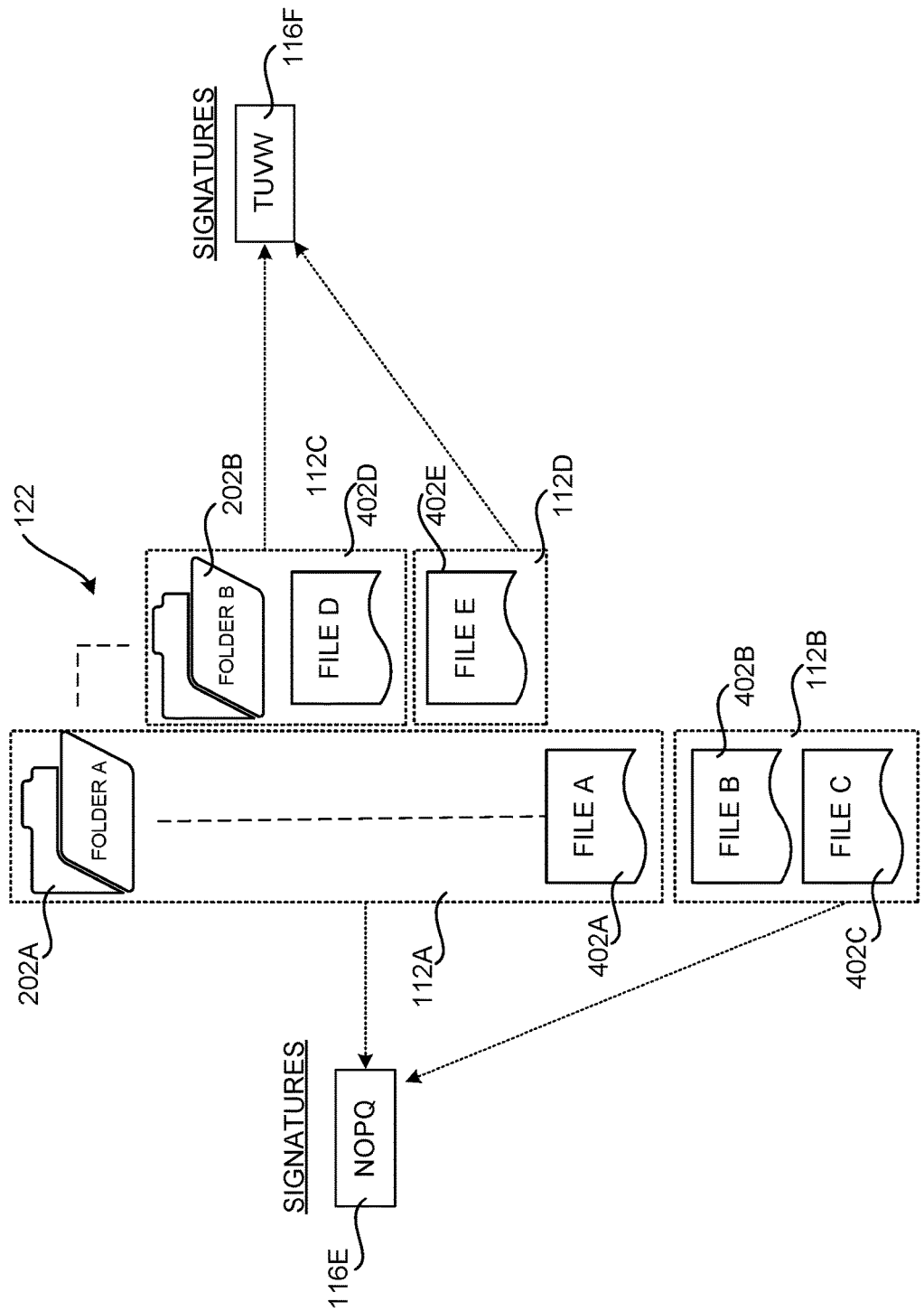
FIG. 4B is a namespace diagram showing an example namespace and illustrating aspects of one mechanism disclosed herein for computing signatures on a per—namespace location basis, according to one embodiment disclosed herein.

FIG. 4B is a namespace diagram showing an example namespace 122 and illustrating aspects of one mechanism disclosed herein for computing signatures 116 per namespace location, according to one embodiment disclosed herein. In the example shown in FIG. 4B, the namespace 122 is a location within a local or remote file system. As in the example shown in FIG. 4A, the location in the example shown in FIG. 4B includes a folder 202A that stores four files 402A-402C and a folder 202B. The folder 202B, in turn, stores two files 402D and 402E.

In the example shown in FIG. 4B, however, the application 102 has been configured to generate signatures 116 on a per namespace location basis. Accordingly, only two signatures 116E and 116F have been generated as compared to four signatures 116A-116D in the example shown in FIG. 4A where signatures 116 have been generated on a per-payload basis. As discussed briefly above and in greater detail below, the configuration illustrated in FIG. 4B enables fewer signatures 116 to be generated and stored, thereby conserving processing resources. Additional details regarding one mechanism for generating signatures 116 for response payloads 112 on a per-payload basis will be provided below with respect to FIG. 5B.

In some embodiments, the application 102 is configured to select the use of per-payload or per-location signature generation dynamically. For example, and without limitation, the application 102 might utilize either per-payload or per-location signature generation depending upon the number of items in a particular location of a namespace 122. The application 102 might generate signatures 116 on a per-location basis for locations containing many items and might generate signatures 116 on a per-payload basis for locations containing few items. Other factors might also be utilized to select the use of per-location or per-payload signature generation on a per-location basis in other embodiments.

In some embodiments, a mask or filter can be applied to a portion of the response payloads 112 prior to generating the signatures 116. For example, and without limitation, a mask might be applied to a field or fields of the namespace metadata 104 in order to mask out that field or fields. Masking out a field or fields of the namespace metadata 104 in this manner might be accomplished by replacing the field or fields with a constant value (e.g., zeros or another character). In this way, the masked out field or fields will always be unchanged (i.e., will always be zeros or another character) and, therefore, will not cause different signatures 116 to be generated for subsequent response payloads 112 for the same location even when the metadata 104 in the masked out field or field changes.

Figure 5A:
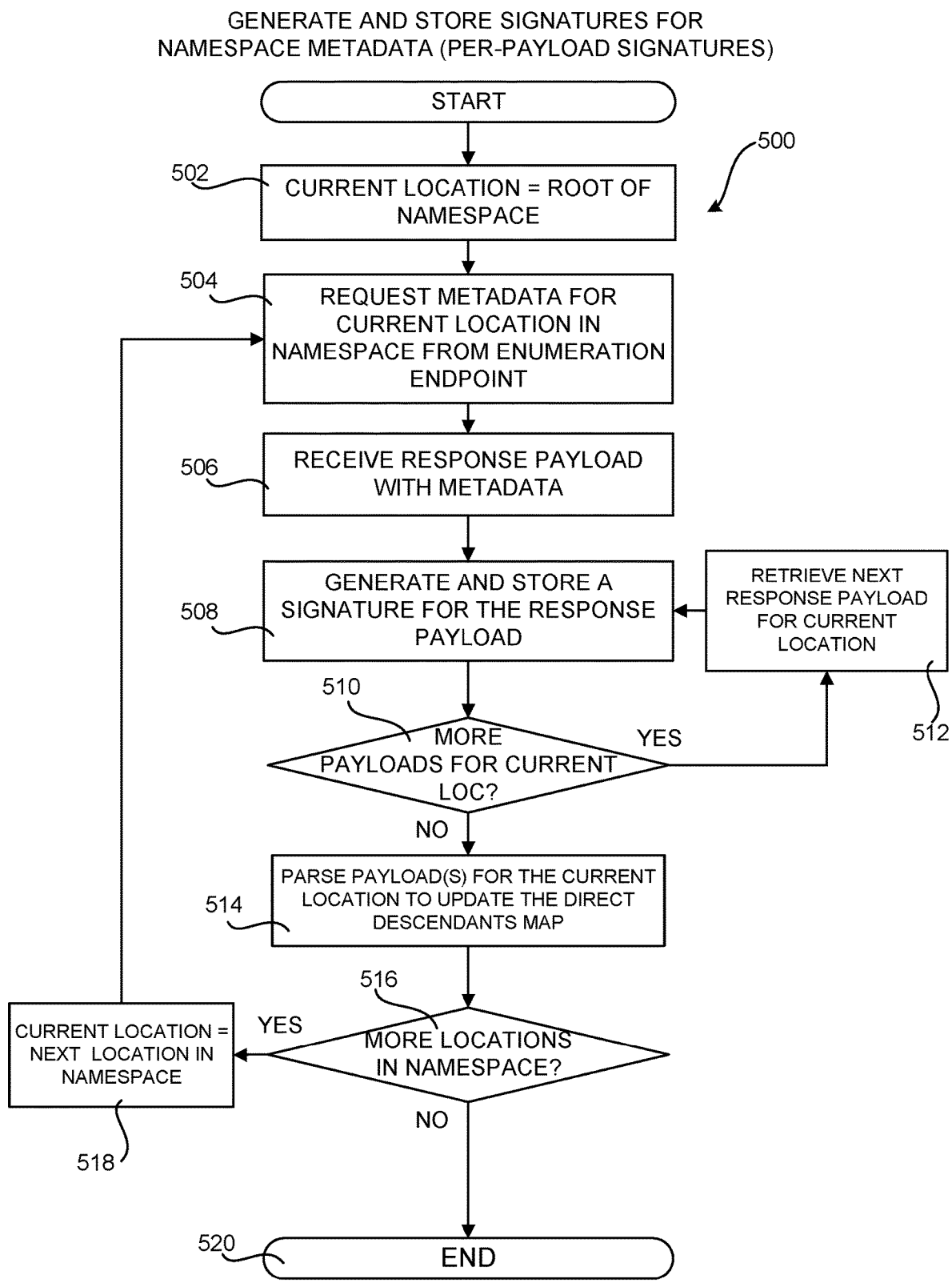
FIG. 5A is a flow diagram showing a routine that illustrates aspects of the mechanism shown in FIGS. 1A-4A for generating and storing signatures for namespace metadata on a per—namespace enumeration endpoint response payload basis, according to one embodiment disclosed herein.

FIG. 5A is a flow diagram showing a routine that illustrates aspects of the mechanism shown in FIGS. 1A-4A for generating and storing signatures 116 for namespace metadata 104 on a per—response payload 112 basis, according to one embodiment disclosed herein. It should be appreciated that the logical operations described herein with regard to FIG. 5A, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to vari-ously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 500 begins at operation 502, where a variable used to track the current location within a namespace 122 that is being analyzed is initialized to point to the root of the namespace 122. The routine 500 then proceeds from operation 502 to operation 504, where the application 102 generates a namespace metadata request 110 to the namespace enumeration endpoint 106 for the current location in the namespace 122. The routine 500 then proceeds from operation 504 to operation 506.

At operation 506, the application 102 receives a response payload 112 in response to the namespace metadata request 110 transmitted at operation 504. The routine 500 then proceeds to operation 508, where the signature generator 114 generates a signature 116 of the response payload 112 received at operation 506. As discussed above, a mask might be applied to a portion of the metadata 104 prior to generating the signature 116. The application 102 then stores the signature 116 in the signatures/namespace location map 118 in the manner described above. The routine 500 then proceeds from operation 508 to operation 510.

At operation 510, the application 102 determines if more payloads 112 remain to be provided by the namespace enumeration endpoint 106 for the current location in the namespace 122. If so, the routine 500 proceeds from operation 510 to operation 512, where the application 102 obtains the next response payload 112 for the current location in the namespace 122 from the namespace enumeration endpoint 106. The routine 500 then proceeds from operation 512 to operation 508, described above, where the signature generator 114 generates a signature 116 of the response payload 112 received at operation 512. As discussed above, a mask might be applied to a portion of the metadata 104 prior to generating the signature 116.

If, however, the application 102 determines at operation 510 that no additional payloads 112 remain to be provided by the namespace enumeration endpoint 106 for the current location in the namespace 122, the routine 500 proceeds from operation 510 to operation 514. At operation 514, the application 102 parses the payloads 112 for the current location in the namespace 122 to identify any locations in the namespace 122 that are direct descendants of the current location. The application 102 then updates the direct descendants map 120 in the manner described above to identify the direct descendants, if any, of the current location in the namespace 122. The routine 500 then proceeds from operation 514 to operation 516.

At operation 516, the application 102 determines if there are additional locations in the namespace 122 for which signatures 116 are to be generated. If additional locations remain to be analyzed, the routine 500 proceeds from operation 516 to operation 518, where the variable identifying the current location in the namespace 122 is updated to reflect the next location to be analyzed. In this regard, it is to be appreciated that the namespace 122 might be enumerated in a depth-first manner, a breadth first manner, or in another manner altogether.

From operation 518, the routine 500 proceeds back to operation 504, where signatures 116 can be generated and stored for the next location in the namespace 122. If, at operation 516, the application 102 determines that no additional locations in the namespace 122 remain to be analyzed, the routine 500 proceeds from operation 516 to operation 520, where it ends.

Figure 5B:
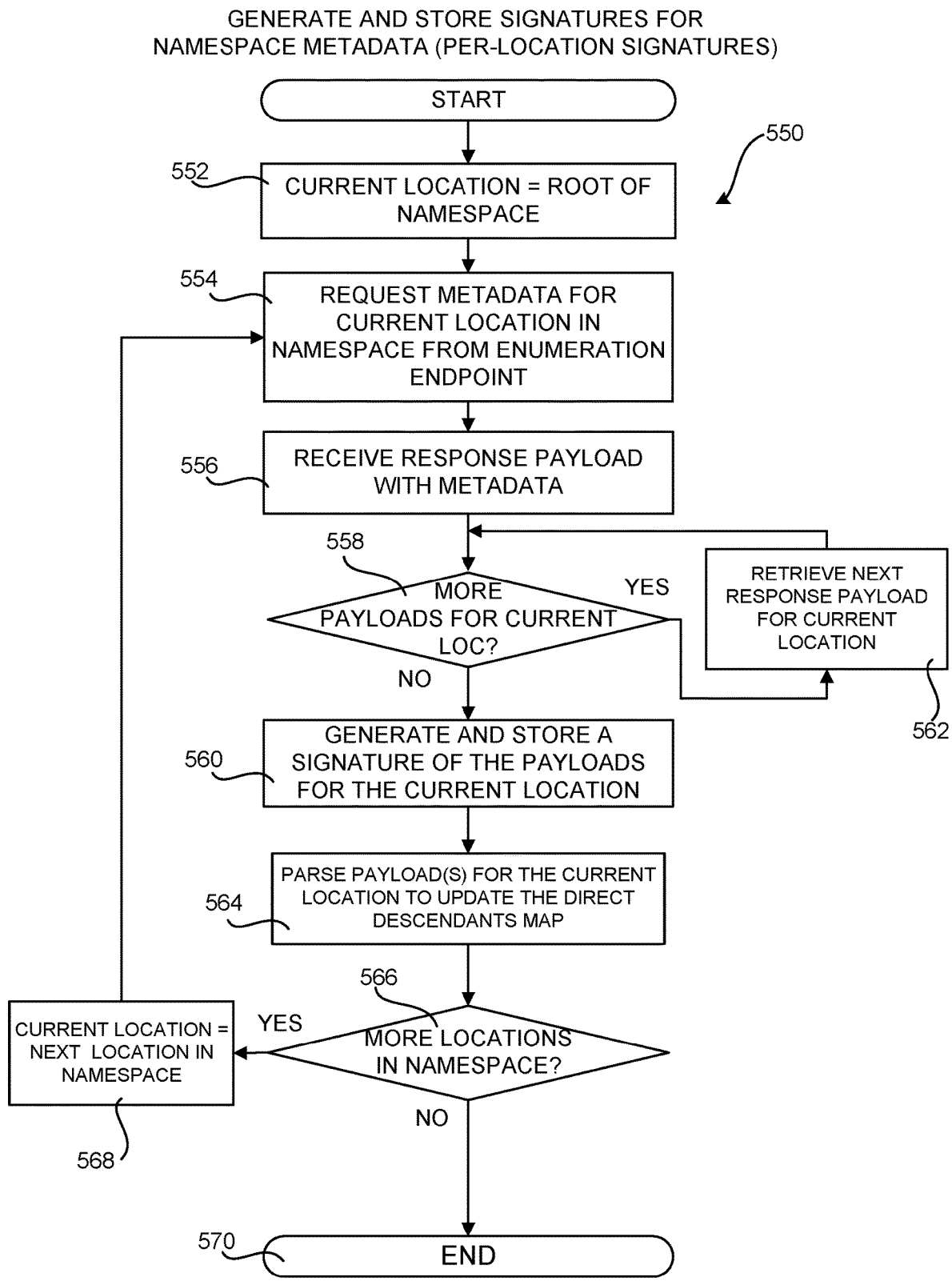
FIG. 5B is a flow diagram showing a routine that illustrates aspects of the mechanism shown in FIGS. 1A-3 and 4B for generating and storing signatures for namespace metadata on a per—namespace location basis, according to one embodiment disclosed herein.

FIG. 5B is a flow diagram showing a routine 550 that illustrates aspects of the mechanism shown in FIGS. 1A-3 and 4B for generating and storing signatures 116 for namespace metadata 104 on a per-location basis, according to one embodiment disclosed herein. The routine 550 begins at operation 552, where a variable used to track the current location within a namespace 122 that is being analyzed is initialized to point to the root of the namespace 122. The routine 500 then proceeds from operation 552 to operation 554, where the application 102 generates a namespace metadata request 110 to the namespace enumeration endpoint 106 for the current location in the namespace 122. The routine 500 then proceeds from operation 554 to operation 556.

At operation 556, the application 102 receives a response payload 112 in response to the namespace metadata request 110 transmitted at operation 554. The routine 500 then proceeds to operation 558, where the application determines if more payloads 112 remain to be provided by the namespace enumeration endpoint 106 for the current location in the namespace 122. If so, the routine 550 proceeds from operation 558 to operation 562, where the application 102 obtains the next response payload 112 for the current location in the namespace 122 from the namespace enumeration endpoint 106. The routine 550 then proceeds back to operation 558 where a determina-tion can be made once again as to whether additional payloads 112 remain for the current location in the namespace 122.

If, however, the application 102 determines at operation 558 that no additional payloads 112 remain to be provided by the namespace enumeration endpoint 106 for the current location in the namespace 122, the routine 550 proceeds from operation 558 to operation 560, where the signature generator 114 generates a single signature 116 based on all of the response payloads 112 for the current location in the namespace 122. As discussed above, a mask might be applied to a portion of the metadata 104 prior to generating the signature 116. The application 102 then stores the signature 116 in the signatures/namespace location map 118 in the manner described above. The routine 550 then proceeds from operation 560 to operation 564.

At operation 564, the application 102 parses the payloads 112 for the current location in the namespace 122 to identify any locations in the namespace 122 that are direct descendants of the current location. The application 102 then updates the direct descendants map 120 in the manner described above to identify the direct descendants, if any, of the current location in the namespace 122. The routine 550 then proceeds from operation 564 to operation 566.

At operation 566, the application 102 determines if there are additional locations in the namespace 122 for which signatures 116 are to be generated. If additional locations remain to be analyzed, the routine 550 proceeds from operation 566 to operation 568, where the variable identifying the current location in the namespace 122 is updated to reflect the next location to be analyzed. In this regard, it is to be appreciated that the namespace 122 might be enumerated in a depth-first manner, a breadth first manner, or in another manner altogether.

From operation 568, the routine 550 proceeds back to operation 554, where a signature 116 can be generated and stored for the next location in the namespace 122. If, at operation 566, the application 102 determines that no additional locations in the namespace 122 remain to be analyzed, the routine 550 proceeds from operation 566 to operation 570, where it ends.

Figure 6:
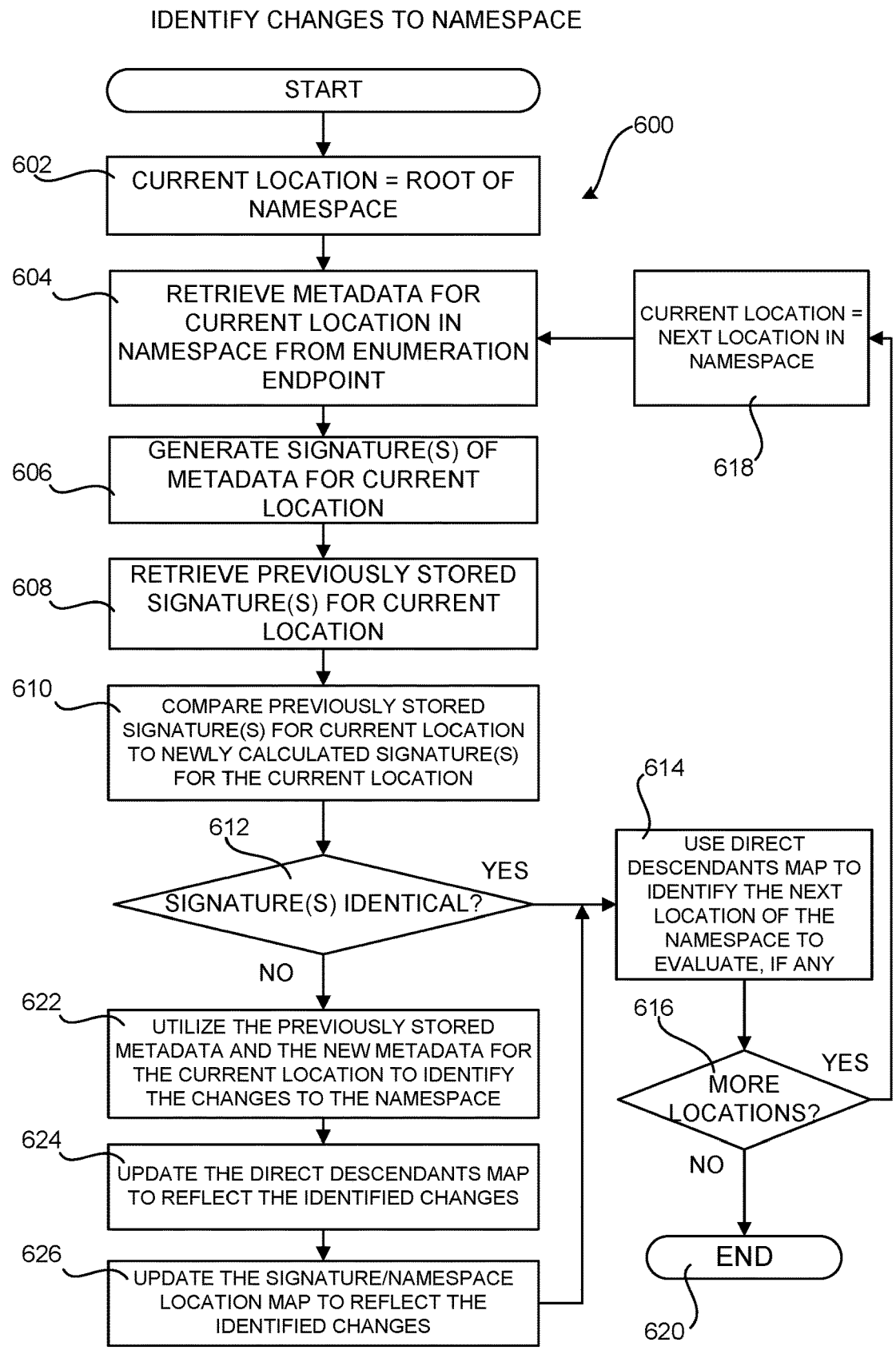
FIG. 6 is a flow diagram showing a routine that illustrates aspects of one mechanism disclosed herein for detecting changes in a namespace using namespace enumeration endpoint response payloads, according to one embodiment disclosed herein.

FIG. 6 is a flow diagram showing a routine 600 that illustrates aspects of one mechanism disclosed herein for detecting changes in a namespace 122 using namespace enumeration endpoint 106 response payloads 112, according to one embodiment disclosed herein. In particular, the processing illustrated by the routine 600 can be performed in order to identify determine if any changes occurred to items in the namespace 122 after the time the processing illustrated in either FIG. 4A or FIG. 4B was performed.

The routine 600 begins at operation 602, where a variable used to track the current location within a namespace 122 that is being analyzed is initialized to point to the root of the namespace 122. The routine 600 then proceeds from operation 602 to operation 604, where the application 102 retrieves response payloads 122 containing the metadata 104 for the current location in the namespace 122 from the namespace enumeration endpoint 106. The routine 600 then proceeds from operation 604 to operation 606.

At operation 606, the signature generator 114 generates signatures 116 for the response payloads 122 containing the metadata 104 for the current location in the namespace 122. As discussed above, the signatures 116 might be generated on a per-payload or a per-location basis. As also discussed above, a mask might be applied to a portion of the metadata 104 prior to generating the signature 116. Once the signatures 116 have been generated, the routine 600 proceeds from operation 606 to operation 608.

At operation 608, the application 102 retrieves the previously stored signatures 116 for the current location in the namespace 122 from the signature/namespace location map 118. The routine 600 then proceeds from operation 608 to operation 610, where the application 102 compares the previously stored signatures 116 retrieved from the signature/namespace location map 118 to the signatures 116 that were generated at operation 606.

If, at operation 612, the application 102 determines that the previously stored signatures 116 retrieved from the signature/namespace location map 118 at operation 608 are identical to the signatures 116 that were generated at operation 606, the routine 600 proceeds from operation 612 to operation 614. At operation 614, the application 102 utilizes the direct descendants map 120 to identify the next location in the namespace 122 to evaluate, if any.

If more locations remain in the namespace 122 to be evaluated, the routine 600 proceeds from operation 616 to operation 618, where the variable utilized to track the current location within the namespace 122 is updated to identify the next location to be analyzed. The routine 600 then proceeds from operation 618 to operation 604, described above. If, at operation 616, the application 102 determines that no additional locations in the namespace 122 remain to be analyzed, the routine 600 proceeds from operation 616 to operation 620, where it ends.

If, at operation 612, the application 102 determines that the previously stored signatures 116 retrieved from the signature/namespace location map 118 at operation 608 are not identical to the signatures 116 that were generated at operation 606, the routine 600 proceeds from operation 612 to operation 622. At operation 614, the application 102 compares the metadata 104 contained in the response payloads 112 used to generate the signature/namespace location map 118 to the metadata 104 contained in the response payloads 112 retrieved at operation 604 to identify the actual changes that occurred in the namespace 122. To perform this functionality, the application 102 might save a copy of the response payloads 112 used to generate the signature/namespace location map 118.

From operation 622, the routine 600 proceeds to operation 624 where the application 102 updates the direct descendants map 120, if necessary, to reflect the changes to the metadata 104. For example, if a folder was created, moved, or deleted, the application 102 might update the direct descendants map 120 to reflect the change in descendants for a parent and/or child folder. The routine 600 then proceeds from operation 624 to operation 626.

At operation 626, the routine 600 updates the signature/namespace location map 118 to reflect the identified changes. For example, and without limitation, the application 102 might replace one or more signatures 116 previously stored in the signature/namespace location map 118 for a changed location with new signatures 116 (i.e., the signatures 116 generated at operation 606) that were generated for the location. The routine 600 then proceeds from operation 626 to operation 614, described above.

Figure 7:
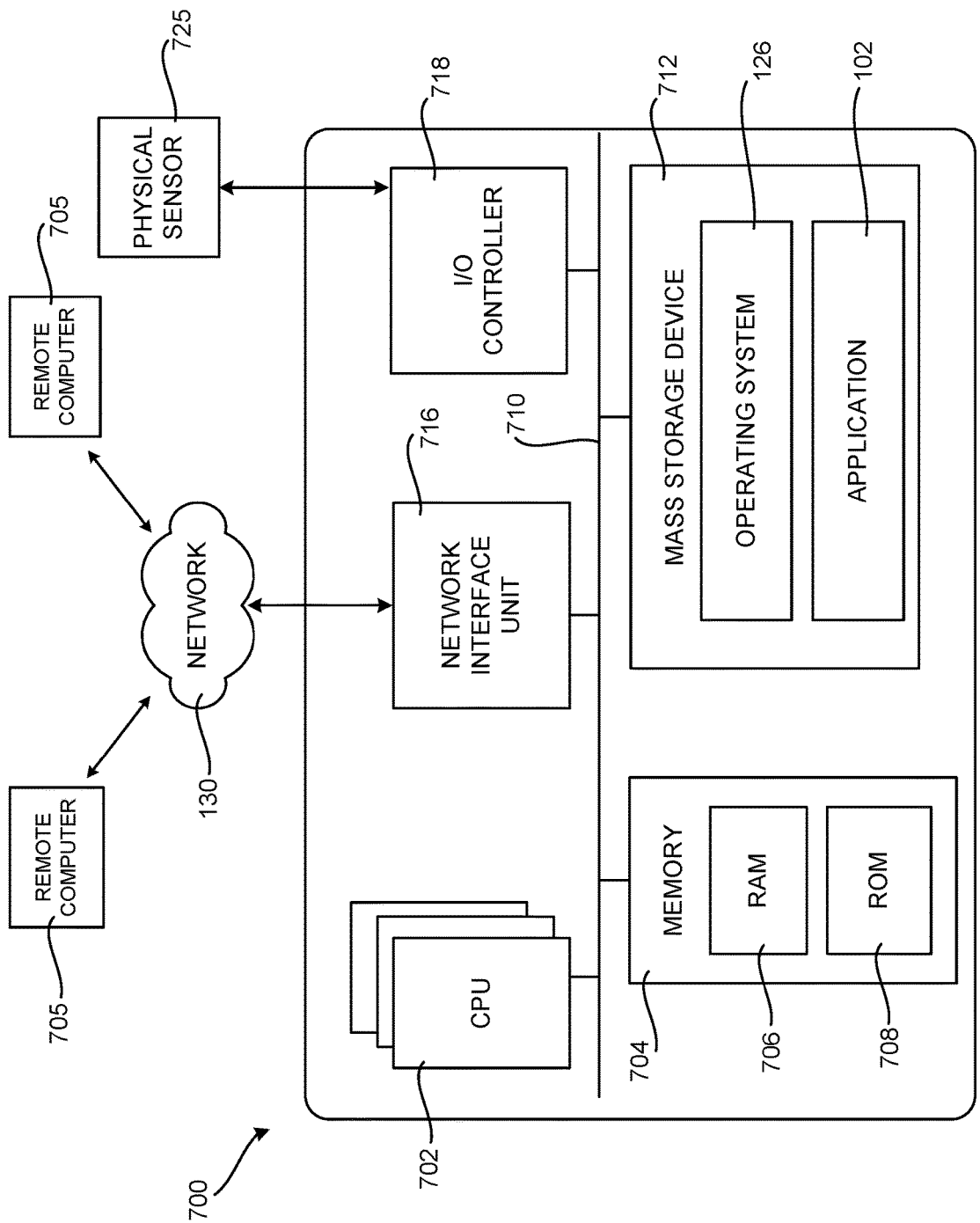
FIG. 7 is a computer architecture diagram showing an illustrative computer hardware and software architecture for a computing device that can implement aspects of the technologies presented herein.

FIG. 7 is a computer architecture diagram showing an illustrative computer hardware and software architecture for a computing device that can implement the various technologies presented herein. In particular, the architecture illustrated in FIG. 7 can be utilized to implement a desktop computer, a laptop computer, a server computer, mobile phone, an e-reader, a smartphone, an augmented reality or virtual reality device, a tablet computer, or another type of computing device. For example, and without limitation, the computer architecture shown in FIG. 7 might be utilized to implement the computing device 124 or the remote server 134 shown in the FIGS. and described above.

The computer 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system ("BIOS" or "firmware") containing the basic routines that help to transfer information between elements within the computer 700, such as during startup, can be stored in the ROM 708. The computer 700 further includes a mass storage device 712 for storing an operating system 126, application programs such as the application 102, and other types of programs. The mass storage device 712 can also be configured to store other types of programs and data such as, but not limited to, the signature/namespace location map 118, the direct descendants map 120, the signatures 116, the signature generator 114, or the response payloads 112.

The mass storage device 712 is connected to the CPU 702 through a mass storage controller (not shown) connected to the bus 710. The mass storage device 712 and its associated computer readable media provide non-volatile storage for the computer 700. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 700. For purposes of the claims, the phrase "computer storage medium," and variations thereof, does not include waves or signals per se or communication media.

According to various configurations, the computer 700 can operate in a networked environment using logical connections to remote computers 705 through a network such as the network 130. The computer 700 can connect to the network 130 through a network interface unit 716 connected to the bus 710. It should be appreciated that the network interface unit 716 can also be utilized to connect to other types of networks and remote computer systems such as those shown in FIG. 10 and described below. The computer 700 can also include an input/output controller 718 for receiving and processing input from a number of other devices, including a keyboard, mouse, touch input, an electronic stylus (not shown in FIG. 7), or a physical sensor 725 such as a video camera. Similarly, the input/output controller 718 can provide output to a display screen or other type of output device (also not shown in FIG. 7).

It should be appreciated that the software components described herein, when loaded into the CPU 702 and executed, can transform the CPU 702 and the overall computer 700 from a general-purpose computing device into a special-purpose computing device customized to facilitate the functionality presented herein. The CPU 702 can be constructed from any number of transistors or other discrete circuit elements, which can individually or collectively assume any number of states. More specifically, the CPU 702 can operate as a finite-state machine, in response to executable instructions contained within the software modules disclosed herein. These computer-executable instructions can transform the CPU 702 by specifying how the CPU 702 transitions between states, thereby transforming the transistors or other discrete hardware elements constituting the CPU 702.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 700 in order to store and execute the software components presented herein. It also should be appreciated that the architecture shown in FIG. 7 for the computer 700, or a similar architecture, can be utilized to implement other types of computing devices, including hand-held computers, video game devices, embedded computer systems, mobile devices such as smartphones, tablets, and augmented or virtual reality devices, and other types of computing devices known to those skilled in the art. It is also contemplated that the computer 700 might not include all of the components shown in FIG. 7, can include other components that are not explicitly shown in FIG. 7, or can utilize an architecture completely different than that shown in FIG. 7.

Figure 8:
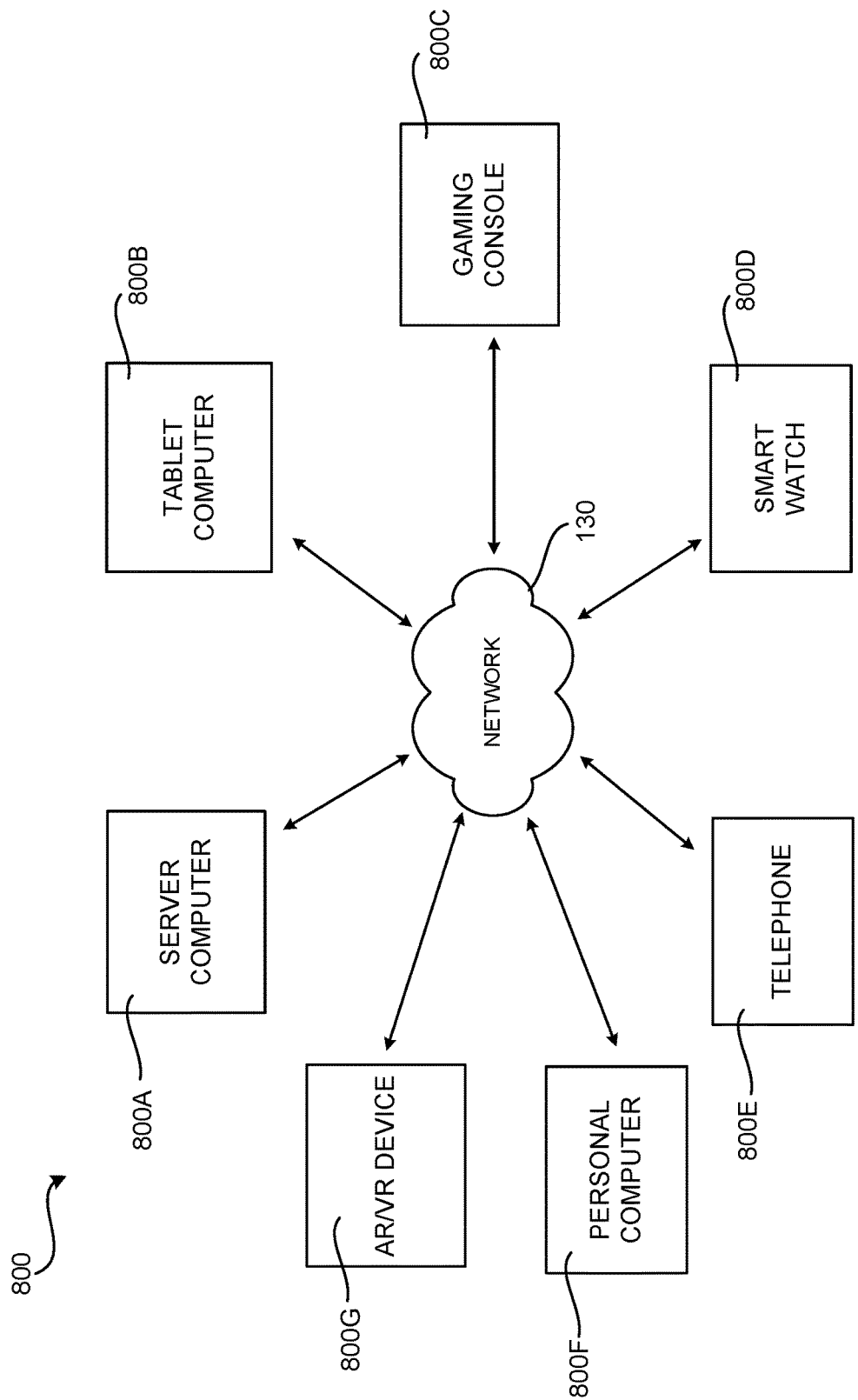
FIG. 8 is a network diagram illustrating a distributed computing environment in which aspects of the disclosed technologies can be implemented.

FIG. 8 is a network diagram illustrating a distributed network computing environment 800 in which aspects of the disclosed technologies can be implemented, according to various embodiments presented herein. As shown in FIG. 8, one or more server computers 800A can be interconnected via a communications network 130 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 800B, a gaming console 800C, a smart watch 800D, a telephone 800E, such as a smartphone, a personal computer 800F, and an augmented or virtual reality device 800G.

In a network environment in which the network 130 is the Internet, for example, the server computer 800A can be a dedicated server computer operable to process and communicate data to and from the client computing devices 800B-800G via any of a number of known protocols, such as, hypertext transfer protocol ("HTTP"), file transfer protocol ("FTP"), a remote desktop protocol, TCP, UDP, or simple object access protocol ("SOAP"). Additionally, the networked computing environment 800 can utilize various data security protocols such as secured socket layer ("SSL") or pretty good privacy ("PGP"). Each of the client computing devices 800B-800G can be equipped with an operating system operable to support one or more computing applications or terminal sessions such as a web browser (not shown in FIG. 8), or other graphical user interface (not shown in FIG. 8), or a mobile desktop environment (not shown in FIG. 8) to gain access to the server computer 800A.

The server computer 800A can be communicatively coupled to other computing environments (not shown in FIG. 8) and receive data regarding a participating user's interactions/resource network. In an illustrative operation, a user (not shown in FIG. 8) may interact with a computing application running on a client computing device 800B-800G to obtain desired data and/or perform other computing applications.

The data and/or computing applications may be stored on the server 800A, or servers 800A, and communicated to cooperating users through the client computing devices 800B-800G over an exemplary network 130. A participating user (not shown in FIG. 8) may request access to specific data and applications housed in whole or in part on the server computer 800A. These data may be communicated between the client computing devices 800B-800G and the server computer 800A for processing and storage.

The server computer 800A can host computing applications, processes and applets for the generation, authentication, encryption, and communication of data and applications, and may cooperate with other server computing environments (not shown in FIG. 8), third party service providers (not shown in FIG. 8), network attached storage ("NAS") and storage area networks ("SAN") to realize application/data transactions.

It should also be appreciated that the computing architecture shown in FIG. 7 and the distributed network computing environment shown in FIG. 8 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A computer-implemented method, comprising: retrieving one or more first response payloads from a file system enumeration application programming interface (API), the one or more first response payloads comprising metadata describing items in a first location in a file system at a first time; generating one or more first signatures for the one or more first response payloads and storing the one or more first signatures; retrieving one or more second response payloads from the file system enumeration API, the one or more second response payloads comprising metadata describing the items in the first location in the file system at a second time; generating one or more second signatures for the one or more second response payloads; comparing the one or more first signatures to the one or more second signatures to determine if the one or more first signatures and the one or more second signatures are identical; and responsive to determining that the one or more first signatures and the one or more second signatures are not identical, identifying changes made to the first location in the file system between the first time and the second time based on the one or more first response payloads and the one or more second response payloads.

Clause 2. The computer-implemented method of clause 1, further comprising: inspecting the one or more first payloads to identify one or more other locations in the file system that are direct descendants of the first location in the file system; storing data defining a mapping between the first location in the file system and the one or more other locations in the file system that are direct descendants of the first location in the file system; and selecting a second location in the file system to evaluate for changes based on the mapping.

Clause 3. The computer-implemented method of any of clauses 1 or 2, wherein a single first signature is generated for each of the one or more first response payloads and wherein a single second signature is generated for each of the one or more second response payloads.

Clause 4. The computer-implemented method of any of clauses 1-3, wherein a single first signature and a single second signature are generated for the first location in the file system.

Clause 5. The computer-implemented method of any of clauses 1-4, further comprising: applying a mask to at least a portion of the one or more first response payloads prior to generating the one or more first signatures for the one or more first response payloads; and applying the mask to at least a portion of the one or more second response payloads prior to generating the one or more second signatures for the one or more second response payloads.

Clause 6. The computer-implemented method of any of clauses 1-5, wherein the file system comprises a local file system.

Clause 7. The computer-implemented method of any of clauses 1-6, wherein the file system comprises a networked file system.

Clause 8. A computer-readable storage medium having computer-executable instructions stored thereupon which, when executed by a computing device, cause the computing device to: retrieve one or more first response payloads from a file system enumeration application programming interface (API), the one or more first response payloads comprising metadata describing items in a first location in a file system at a first time; generate one or more first signatures for the one or more first response payloads and storing the one or more first signatures; retrieve one or more second response payloads from the file system enumeration API, the one or more second response payloads comprising metadata describing the items in the first location in the file system at a second time; generate one or more second signatures for the one or more second response payloads; and determine whether the first location in the file system has changed between the first time and the second time by comparing the one or more first signatures to the one or more second signatures to determine if the one or more first signatures and the one or more second signatures are identical.

Clause 9. The computer-readable storage medium of clause 8, having further computer-executable instructions stored thereupon which, when executed by the computing device, cause the computing device to: responsive to determining that the one or more first signatures and the one or more second signatures are not identical, identify changes made to the first location in the file system between the first time and the second time based on the one or more first response payloads and the one or more second response payloads.

Clause 10. The computer-readable storage medium of clauses 8 or 9, having further computer-executable instructions stored thereupon which, when executed by the computing device, cause the computing device to: inspect the one or more first payloads to identify one or more other locations in the file system that are direct descendants of the first location in the file system; store data defining a mapping between the first location in the file system and the one or more other locations in the file system that are direct descendants of the first location in the file system; and select a second location in the file system to evaluate for changes based on the mapping.

Clause 11. The computer-readable storage medium of any of clauses 8-10, wherein a single first signature is generated for each of the one or more first response payloads and wherein a single second signature is generated for each of the one or more second response payloads.

Clause 12. The computer-readable storage medium of any of clauses 8-11, wherein a single first signature and a single second signature are generated for the first location in the file system.

Clause 13. The computer-readable storage medium of any of clauses 8-12, having further computer-executable instructions stored thereupon which, when executed by the computing device, cause the computing device to: apply a mask to at least a portion of the one or more first response payloads prior to generating the one or more first signatures for the one or more first response payloads; and apply the mask to at least a portion of the one or more second response payloads prior to generating the one or more second signatures for the one or more second response payloads.

Clause 14. A computing device, comprising: at least one processor; and a computer-readable storage medium having computer-executable instructions stored thereupon which, when executed by the at least one processor, cause the computing device to: retrieve first metadata describing items in a location in a namespace from a namespace enumeration endpoint at a first time; compute one or more first signatures for the first metadata and storing the first signature; retrieve second metadata describing the items in the location in the namespace from the namespace enumeration endpoint at a second time; compute one or more second signatures for the second metadata; compare the one or more first signatures to the one or more second signatures to determine if the one or more first signatures and the one or more second signatures are different; and identify changes made to the location in the namespace between the first time and the second time based on the first metadata and the second metadata responsive to determining that the one or more first signatures and the one or more second signatures are different.

Clause 15. The computing device of clause 14, wherein the computer-readable storage medium has further computer-executable instructions stored thereupon to: apply a mask to at least a portion of the first metadata prior to generating the one or more first signatures for the first metadata; and apply the mask to at least a portion of the second metadata prior to generating the one or more second signatures for the second metadata.

Clause 16. The computing device of clauses 14 or 15, wherein the namespace enumeration endpoint comprises a file system enumeration application programming interface (API).

Clause 17. The computing device of any of clauses 14-16, wherein the namespace corresponds to a portion of a file system.

Clause 18. The computing device of any of clauses 14-17, wherein the first metadata and the second metadata comprise one or more response payloads received from the file system enumeration API.

Clause 19. The computing device of any of clauses 14-18, wherein a single first signature and a single second signature are computed for each of the one or more response payloads.

Clause 20. The computing device of any of clauses 14-19, wherein a single first signature and a single second signature are computed for the first location in the namespace.

Based on the foregoing, it should be appreciated that technologies for detecting changes in a namespace using namespace enumeration endpoint response payloads have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
retrieving one or more first response payloads from a file system enumeration application programming interface (API), the one or more first response payloads comprising metadata describing items in a first location in a file system at a first time;
generating one or more first signatures for the one or more first response payloads and storing the one or more first signatures;
retrieving one or more second response payloads from the file system enumeration API, the one or more second response payloads comprising metadata describing the items in the first location in the file system at a second time;
generating one or more second signatures for the one or more second response payloads;
comparing the one or more first signatures to the one or more second signatures to determine if the one or more first signatures and the one or more second signatures are identical; and
responsive to determining that the one or more first signatures and the one or more second signatures are not identical, identifying changes made to the first location in the file system between the first time and the second time based on the one or more first response payloads and the one or more second response payloads.

2. The computer-implemented method of claim 1, further comprising:
inspecting the one or more first payloads to identify one or more other locations in the file system that are direct descendants of the first location in the file system;
storing data defining a mapping between the first location in the file system and the one or more other locations in the file system that are direct descendants of the first location in the file system; and
selecting a second location in the file system to evaluate for changes based on the mapping.

3. The computer-implemented method of claim 1, wherein a single first signature is generated for each of the one or more first response payloads and wherein a single second signature is generated for each of the one or more second response payloads.

4. The computer-implemented method of claim 1, wherein a single first signature and a single second signature are generated for the first location in the file system.

5. The computer-implemented method of claim 1, further comprising:
applying a mask to at least a portion of the one or more first response payloads prior to generating the one or more first signatures for the one or more first response payloads; and
applying the mask to at least a portion of the one or more second response payloads prior to generating the one or more second signatures for the one or more second response payloads.

6. The computer-implemented method of claim 1, wherein the file system comprises a local file system.

7. The computer-implemented method of claim 1, wherein the file system comprises a networked file system.

8. A computer-readable storage medium having computer-executable instructions stored upon a memory which, when executed by a computing device, cause the computing device to:
retrieve one or more first response payloads from a file system enumeration application programming interface (API), the one or more first response payloads comprising metadata describing items in a first location in a file system at a first time;
generate one or more first signatures for the one or more first response payloads and storing the one or more first signatures;
retrieve one or more second response payloads from the file system enumeration API, the one or more second response payloads comprising metadata describing the items in the first location in the file system at a second time;
generate one or more second signatures for the one or more second response payloads; and
determine whether the first location in the file system has changed between the first time and the second time by comparing the one or more first signatures to the one or more second signatures to determine if the one or more first signatures and the one or more second signatures are identical.

9. The computer-readable storage medium of claim 8, having further computer-executable instructions stored upon the memory which, when executed by the computing device, cause the computing device to:
responsive to determining that the one or more first signatures and the one or more second signatures are not identical, identify changes made to the first location in the file system between the first time and the second time based on the one or more first response payloads and the one or more second response payloads.

10. The computer-readable storage medium of claim 8, having further computer-executable instructions stored upon the memory which, when executed by the computing device, cause the computing device to:
   inspect the one or more first payloads to identify one or more other locations in the file system that are direct descendants of the first location in the file system;
   store data defining a mapping between the first location in the file system and the one or more other locations in the file system that are direct descendants of the first location in the file system; and
   select a second location in the file system to evaluate for changes based on the mapping.

11. The computer-readable storage medium of claim 8, wherein a single first signature is generated for each of the one or more first response payloads and wherein a single second signature is generated for each of the one or more second response payloads.

12. The computer-readable storage medium of claim 8, wherein a single first signature and a single second signature are generated for the first location in the file system.

13. The computer-readable storage medium of claim 8, having further computer-executable instructions stored upon the memory which, when executed by the computing device, cause the computing device to:
   apply a mask to at least a portion of the one or more first response payloads prior to generating the one or more first signatures for the one or more first response payloads; and
   apply the mask to at least a portion of the one or more second response payloads prior to generating the one or more second signatures for the one or more second response payloads.

14. A computing device, comprising:
   at least one processor; and
   a computer-readable storage medium having computer-executable instructions stored thereupon which, when executed by the at least one processor, cause the computing device to:
      retrieve first metadata describing items in a location in a namespace from a namespace enumeration endpoint at a first time;
      compute one or more first signatures for the first metadata and storing the first signature;
      retrieve second metadata describing the items in the location in the namespace from the namespace enumeration endpoint at a second time;
      compute one or more second signatures for the second metadata;
      compare the one or more first signatures to the one or more second signatures to determine if the one or more first signatures and the one or more second signatures are different; and
      identify changes made to the location in the namespace between the first time and the second time based on the first metadata and the second metadata responsive to determining that the one or more first signatures and the one or more second signatures are different.

15. The computing device of claim 14, wherein the computer-readable storage medium has further computer-executable instructions stored thereupon to:
   apply a mask to at least a portion of the first metadata prior to generating the one or more first signatures for the first metadata; and
   apply the mask to at least a portion of the second metadata prior to generating the one or more second signatures for the second metadata.

16. The computing device of claim 14, wherein the namespace enumeration endpoint comprises a file system enumeration application programming interface (API).

17. The computing device of claim 16, wherein the namespace corresponds to a portion of a file system.

18. The computing device of claim 17, wherein the first metadata and the second metadata comprise one or more response payloads received from the file system enumeration API.

19. The computing device of claim 18, wherein a single first signature and a single second signature are computed for each of the one or more response payloads.

20. The computing device of claim 18, wherein a single first signature and a single second signature are computed for the first location in the namespace.

* * * * *